United States Patent [19]

Carrio

[11] Patent Number: 4,690,181
[45] Date of Patent: Sep. 1, 1987

[54] APPARATUS TO TRANSFER FLUID BETWEEN A FIXED STRUCTURE AND A ROTATABLE STRUCTURE BY USING AT LEAST ONE FLEXIBLE CONDUIT

[75] Inventor: Pierre Carrio, Paris, France

[73] Assignee: Coflexip, Paris, France

[21] Appl. No.: 796,786

[22] Filed: Nov. 12, 1985

[30] Foreign Application Priority Data

Nov. 12, 1984 [FR] France .................... 84 17207

[51] Int. Cl.⁴ .................... B63B 5/00; E21B 43/01
[52] U.S. Cl. .................... 141/388; 141/382; 414/5; 137/355.22; 137/355.16; 114/230; 166/355
[58] Field of Search .................... 141/1, 98, 231, 232, 141/387-389, 382; 254/272, 273; 114/74 R, 74 T, 74 A, 254, 230; 441/4, 5; 242/47.1, 47.01, 47.12; 137/355.12, 355.16, 355.17, 355.2, 355.22, 355.26, 355.28, 899.2, 615; 166/350, 355, 352, 354, 366

[56] References Cited

U.S. PATENT DOCUMENTS

| 3,602,302 | 8/1971 | Kluth .................... 166/376 |
| 3,742,536 | 7/1973 | Sada et al. .................... 441/5 |
| 4,067,202 | 1/1978 | Reed .................... 141/388 X |
| 4,206,782 | 6/1980 | Tuson .................... 137/615 |
| 4,273,066 | 6/1981 | Anderson .................... 141/387 X |
| 4,388,022 | 6/1983 | Gentry et al. .................... 166/350 X |
| 4,436,048 | 3/1984 | Gentry et al. .................... 114/230 |
| 4,478,586 | 10/1984 | Gentry et al. .................... 441/4 |
| 4,597,595 | 7/1986 | Wallace .................... 285/119 |

FOREIGN PATENT DOCUMENTS 1436739 5/1976 United Kingdom .................... 141/388

*Primary Examiner*—Stephen Marcus
*Assistant Examiner*—Ernest G. Cusick

[57] ABSTRACT

An apparatus provides a swivelless connection of first and second fixed positions on respective first and second structures. The structures are relatively rotatable about a common axis, through a length of flexible conduit defined by first and second space portions thereof respectively connected to the first and second fixed positions and predetermined in accordance with the extent of relative rotation to be accommodated while continuously maintaining the connection.

24 Claims, 17 Drawing Figures

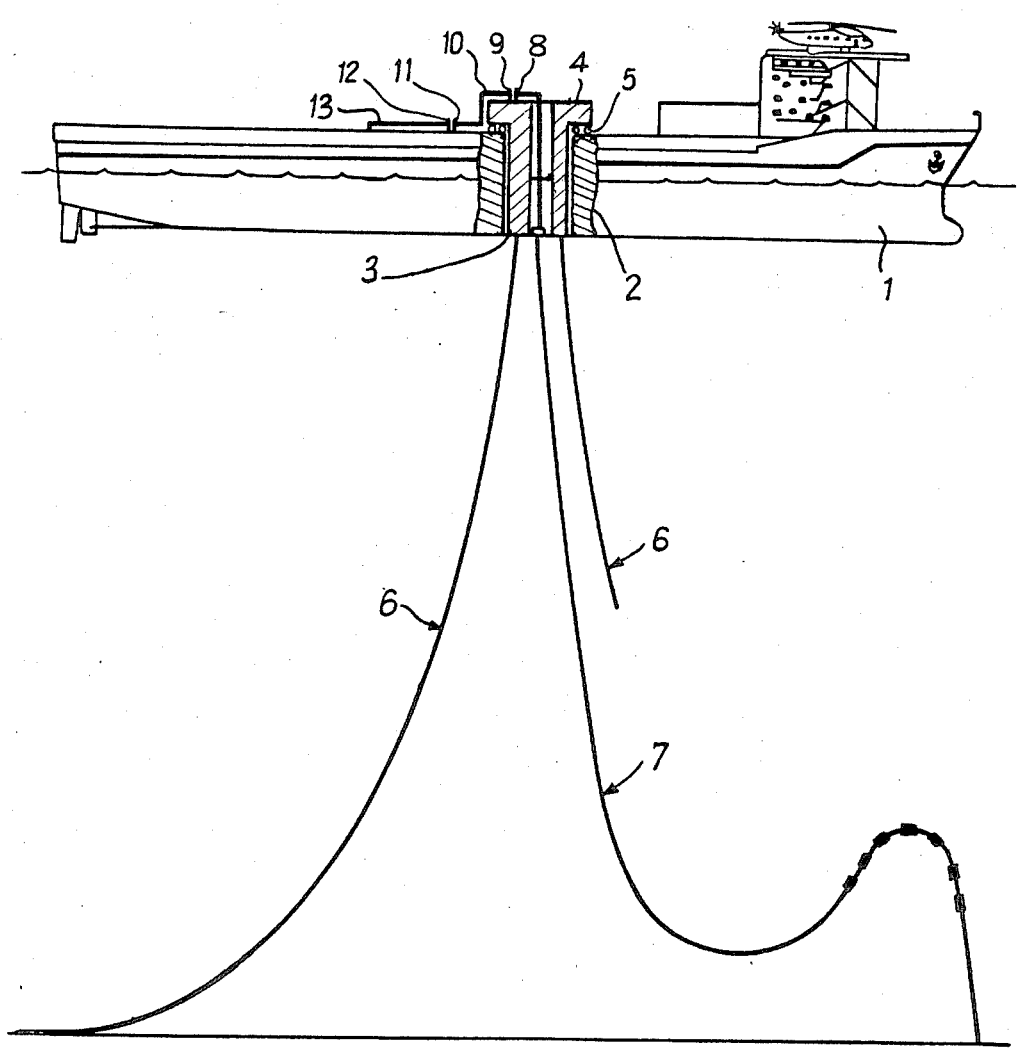

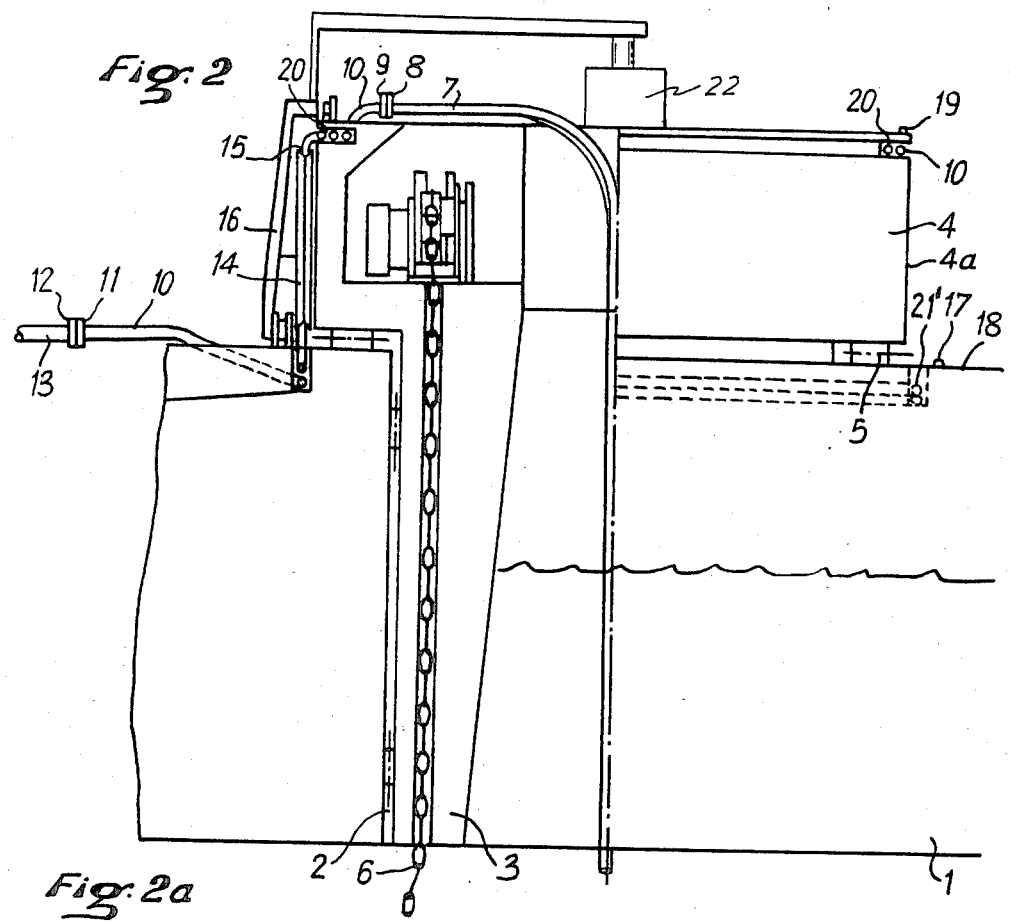
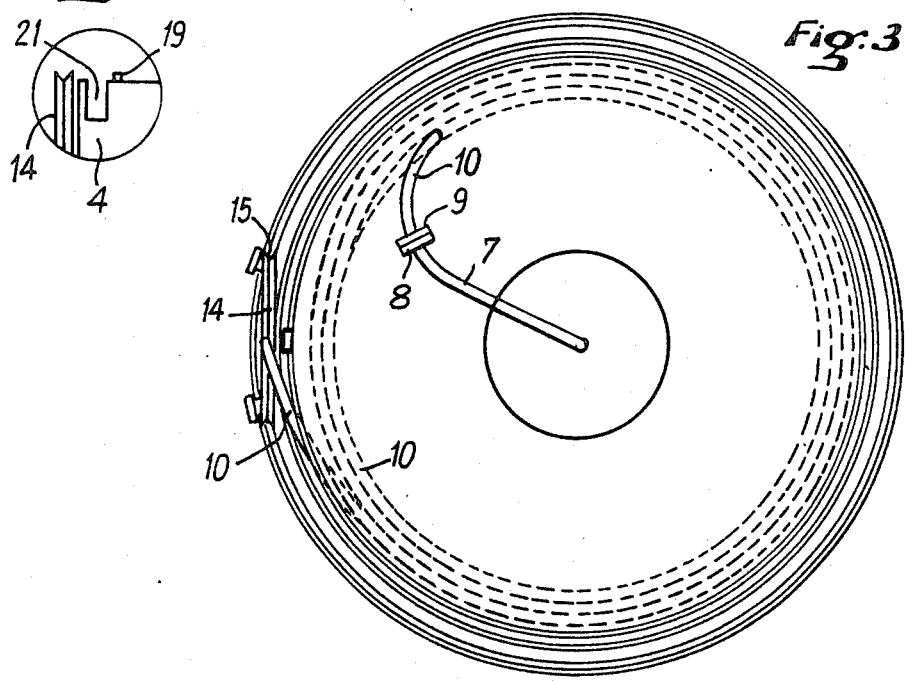

APPARATUS TO TRANSFER FLUID BETWEEN A FIXED STRUCTURE AND A ROTATABLE STRUCTURE BY USING AT LEAST ONE FLEXIBLE CONDUIT

BRIEF SUMMARY OF THE INVENTION

The present invention relates to apparatus for transfer of fluid between a fixed structure and a rotatable structure by using at least one flexible hose or conduit having at each of its ends a connector able to coact with corresponding connectors located on the fixed structure and the moveable structure, the connectors advantageously being of the rapid connection and release type.

The flexible hoses or conduits according to the invention can for example be tubular hoses for hydrocarbon production, electric or hydraulic control lines for drilling installations and/or hydrocarbon production from submarine wells, or can be the kill and choke types of lines for controlling an undersea well head from the surface.

The moveable structure according to the invention can in particular be a drilling or production ship provided with a "moon-pool" type well or housing inside of which is a fixed structure at least partially cylindrical, such as a turret or table, and which is connected to anchor lines to the undersea bottom or is otherwise immobilized under the action of dynamic positioning means installed on the movable structure. The transfer hose or hoses, in accordance with the invention, are connected between the fixed cylindrical structure and the submarine wellhead or wellheads. In general, the cylindrical structure can be in the form of a turret having an upper platform or table supported by a rolling or bearing mechanism on the deck of the ship. The ship is thus able to turn or rotate with respect to the turret, under the influence of wind, waves, and current.

BACKGROUND OF THE INVENTION

Since the line or lines for fluid transfer must be connected at one end to the ship, which is the moveable structure, and at the other end to the fixed turret around which the ship turns, problems occur in insuring the total security of the fluid transfer connection, in particular during extensive rotations which may involve several turns of the ship in the same direction about the turret.

One possible solution is to provide, on the turret, a swivel joint through which the transferred fluids can flow. However, in view of the relatively high pressures which hydrocarbons in particular can reach during their production, for example, pressures commonly of one hundred bars or more, swivel joint mechanisms are not very reliable, and present numerous problems particularly with respect to sealing.

Further, the gases from petroleum production are often explosive and, when present in the swivel joint, can cause severe accidents where the hoses or conduits also have electrical lines.

Such problems have led to a search for solutions to eliminate the use of swivel joints. These solutions, in view of the very large dimensions of the structures involved and the complex kinematics and motions, have resulted in structures which are both very expensive and relatively difficult to operate.

SUMMARY OF THE INVENTION

The present invention provides an apparatus which, while being relatively simple and economical, insures the transfer of fluid reliably without using a swivel joint mechanism.

The apparatus according to the invention is characterized by the fact that the hose or conduit (or each of the hoses, pipes or conduits) extends around a curved support surface advantageously constituted by the periphery of a wheel having at least one peripheral groove, the axis or axle of the wheel preferably being placed radially with respect to the fixed structure and orthogonally to the axis of this fixed structure. The curved hose support surface is guided on the fixed structure and/or the moveable structure so as to move concentrically around the fixed structure in the region of the sidewall or periphery of the fixed structure.

In one embodiment of the invention, the curved support surface, takes the form of a roller track or a curved gutter.

In the embodiment in which the curved support surface is on a wheel, the wheel is preferably mounted for free rotation but can, as a variation, be provided with driving means for rotating the wheel. In addition, the curved support surface is associated with driving motor means acting in such a way during its circular displacement around the fixed structure that tension is exerted on the hose(s) or conduit(s) by the corresponding curved support surface.

In a first embodiment the curved support surface can be mounted on a moveable stand or framework, the framework in one embodiment being supported by and guided at its lower end on a rail or track on the moveable structure, and being guided at its upper end on a rail or a track supported by an upper portion of the fixed structure.

In a second embodiment, the curved support surface can be guided in a peripheral guide made in the sidewall of the fixed structure.

Storage means for the flexible hoses are provided on the moveable structure and on the fixed structure.

The storage means on the moveable structure can advantageously take the form of an annular well or recess in which the successive turns of the flexible hose or conduits are placed one above the other vertically.

This solution is the most useful, but of course as a variation, the successive turns can be arranged horizontally on a platform of the moveable structure.

The storage means on the fixed structure have, in a first embodiment, at least one recess opening radially outwardly of the sidewall of the fixed structure in the region of its upper portion, the windings or turns of the hoses being placed horizontally in the groove, or grooves, in the case of multiple conduits.

As a variation, the storage means on the fixed structure can include a vertical opening groove formed in the fixed structure in the vicinity of its periphery, and in which the successive turns or windings engage one above the other vertically.

Means for guiding the flexible hoses can be provided, preferably on the curved support surface(s), the guilding means also being provided on the fixed structure and/or the moveable structure, to facilitate the storing and unwinding of the hose or hoses.

According to the invention, there can be provided a curved support surface, or as a variation a set of curved support surfaces, in particular in the form of a single wheel with several peripheral grooves which can be used for a set of hoses when arranged in a bundle or group.

In the case of production conduits, and to allow a significant number of successive rotations in the same direction of the movable structure with respect to the fixed structure, two hoses can be provided, each associated with a different curved support surface, the two hoses being permanently connected at their respectively corresponding, common end, either to the fixed structure or to the moveable structure. Each of the structures is provided with connectors for joining to the corresponding connectors of the hoses or conduits, and the length of each hose is equal to or slightly greater than one half the circumference of the fixed structure. Such an arrangement provides for multiple revolutions by selectively connecting and disconnecting the hoses as the moveable structure, namely the ship, revolves slowly about the fixed structure. In this arrangement, valves are provided to stop the flow of fluid through one hose just before it is disconnected, and to permit flow through the other hose or conduit just after it is connected.

Other features and characteristics of the invention will become apparent from the following description which is presented as a nonlimiting example of preferred embodiments with reference to the accompanying drawings.

BRIEF DESCRIPTION OF DRAWINGS

FIG. 1 shows a production support in the form of a ship, provided with the fluid transfer apparatus according to the invention;

FIG. 2 is an enlarged schematic view, half in cross-section showing one example of the apparatus according to the invention:

FIG. 2a shows a variation of the hose storage arrangement of the apparatus of FIG. 2:

FIG. 3 is a top view schematically showing the apparatus of FIG. 2:

DETAILED DESCRIPTION

Figure 4A:
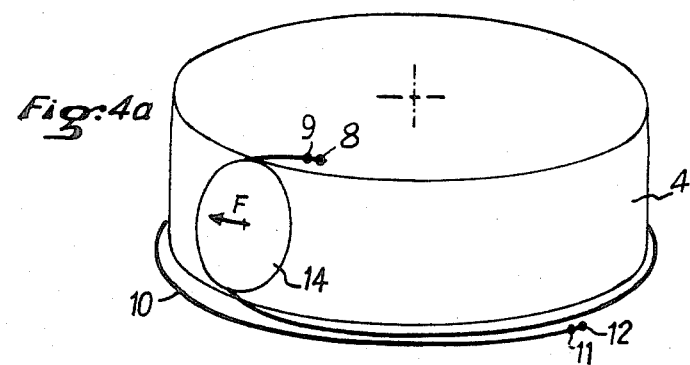
FIGS. 4a to 4d are diagramatic views showing the principle of operation of the device according to the invention, and showing the components of the apparatus in different relative rotational positions.

FIG. 1 shows a production support ship 1 (i.e., a movable or rotatable structure) having a "moon-pool" well or housing 2 within which is a cylindrical turret 3 having a platform or table 4 supported by the deck of the ship via a roller mechanism 5.

The turret 3 is held fixed or essentially fixed against rotation by connecting the turret to the undersea bottom with anchor lines 6.

The numeral 7 designates a set of flexible hoses or conduits for raising hydrocarbon products from submarine wells by remote control. Such flexible hoses 7 are made and marketed in very long lengths by applicant's assignee. For brevity of description, such a set or group of hoses or conduits 7 will hereafter be designated by the term flexible conduit 7.

Flexible conduit 7 traverses the turret 3 vertically and extends upwardly through the table 4 located at the upper end of the turret. Hose 7 has a connector 8 which can be joined to a corresponding connector 9 of a hose or conduit 10 which has at its other end an connector 11 which can be connected to a connector 12 of a conduit 13.

Connectors 8 and 9 and 11 and 12 are of the rapidly releasable and connectable type, which are presently used in the petroleum industry.

The hydrocarbons raised from the marine floor and which pass through conduit 7 must pass through hose 10 and then through conduit 13 to fill the hydrocarbon receiving tank of the ship.

FIGS. 2 and 3 show one embodiment of an apparatus according to the invention.

As shown, there is a wheel 14 having a peripheral groove 15, the wheel being mounted for rotation about a horizontal axle in the region of the side wall 4a of the upper table 4 of turret 3.

The wheel 14 is mounted on a frame or crossbar 16 having roller means 25 at its lower end for rolling on a circular track 17 supported by the deck 18 of ship 1. At the upper portion of crossbar 16 there are provided means rolling on a rail or track 19 supported by table 4 of the fixed structure 3.

To store hose 10 on the turret or fixed structure 3, a radially outwardly opening peripheral groove 20 is provided in sidewall 4a to provide for horizontal storage of hose 10.

In a variation, as shown in FIG. 2a, an annular groove 21 is provided in the top of table 4.

An annular well 21' is also provided for vertical storage of the flexible hose 10 on the deck of the ship i.e. the rotatable structure.

Motor means 22 are provided to rotate framework 16 and correspondingly, wheel 14 and its horizontal axle around table 4. Suitable conduit guide means (not shown) are also provided on the crossbar 16 to guide the conduit 7 in the storage means such as the grooves 20, 21, and 21'.

FIGS. 4a to 4d these FIGS. show schematically the different positions of the apparatus according to the invention, in different relative positions of the ship 1 (which constitutes the rotatable structure) with respect to the fixed structure, namely, the turret 3 and its table 4. The relative positions shown as well as the directions of the arrows S1, and A, are the directions seen by an observer on the deck 18 of the ship.

In the position shown at FIG. 4a, the flexible hose 10 is substantially entirely stored on the deck 18 of the ship 1.

Figure 4B:
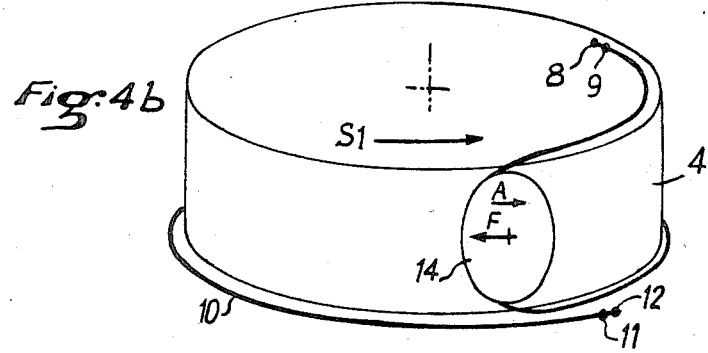

FIG. 4b shows an intermediate relative rotational position of the ship 1 with respect to the table 4, in which hose 10 is in the process of moving from the ship 1 (i.e., the) rotatable structure, to then be stored on the table 4 (i.e., the fixed structure), during relative rotation of the rotatable structure with respect to the fixed structure, in the direction seen by an observer on the deck of the ship 1, and which is indicated by arrow S1.

As can be seen, the wheel 14 moves in the direction indicated by arrow A, relative to fixed structure 4, and the motor means 22 associated with the crossbar 16 exerts on the wheel 14 and crossbar 16, a force directed in the direction of arrow F to maintain pressure against and to tension hose 10 which is positioned in the peripheral 15 groove of wheel 14.

Figure 4C:
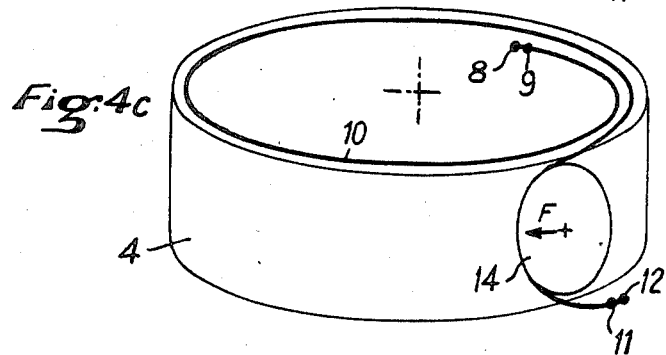

FIG. 4c shows the final position of the hose 10 which is now seen to be substantially entirely stored or supported on fixed structure 4. It is believed evident that as the rotatable structure 1 revolves relative to the fixed structure 4, the hose 10 is transferred from a storage position on the movable structure 1 to a storage position on the fixed structure 4 as shown at FIG. 4c.

Figure 4D:
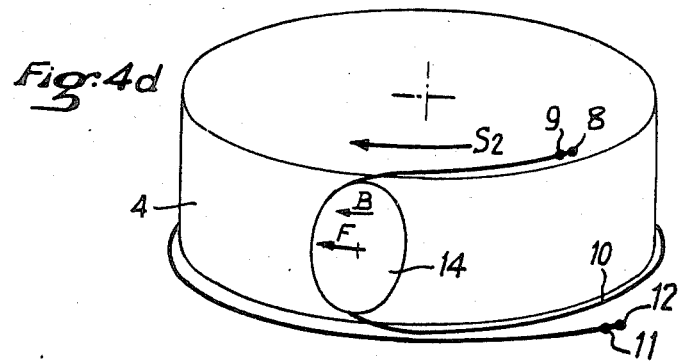

FIG. 4d shows an intermediate position of the hose 10 and its storage, during rotation of the rotatable structure 1 in the direction indicated by the arrow S2, from the starting position of FIG. 4c. As shown at FIG. 4d, the hose 10 is being released or removed from the fixed structure 4 and stored on the rotatable structure. The wheel 14 then moves in the direction of arrow B around the fixed structure 4.

It will be understood that the length of hose 10 is selected as a function of the number of turns in one direction which it is desired to permit for the rotatable structure 1 relative to the fixed structure 4, without having to connect and disconnect the connecting means 8, 9 or the connecting means 11, 12.

Referring now to FIGS. 5a to 5i, an embodiment will now be described which allows, while using only short lengths of flexible hoses, any number of rotations in the same direction of the rotatable structure with respect to the fixed structure, while insuring continuity of the transfer of fluid between the fixed structure and the movable structure.

In this embodiment, there two hoses 10a and 10b each provided with end connectors 9a, 11a, and 9b, 11b respectively, connectors 9a and 9b remaining permanently connected to the corresponding connector not shown, on the fixed structure 4.

In this embodiment, two wheels, 14a and 14b are provided, one for each of the tubular hoses 10a and 10b.

Figure 5A:
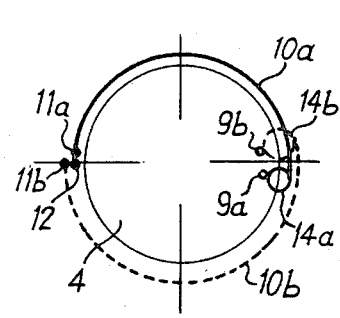
FIGS. 5a to 5i are diagramatic schematic views showing the principle of operation of a second embodiment of the device according to the invention in different relative positions of rotation.
Figure 5B:
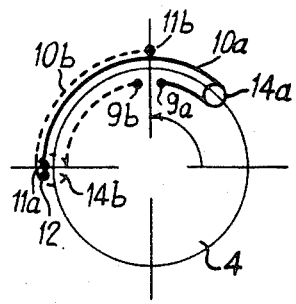
Figure 5C:
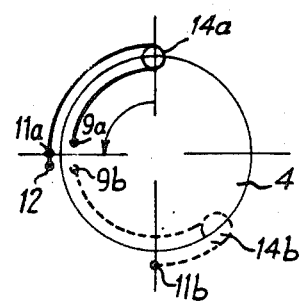
Figure 5D:
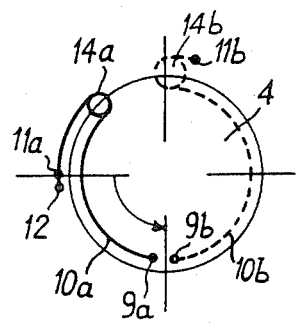
Figure 5E:
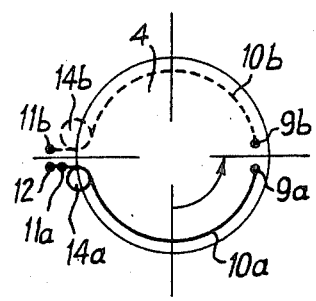
Figure 5F:
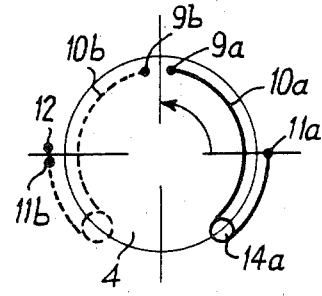
Figure 5G:
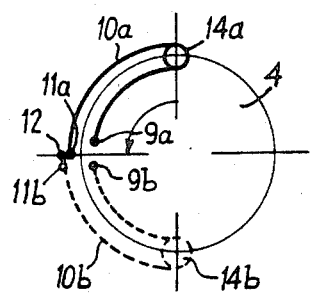
Figure 5H:
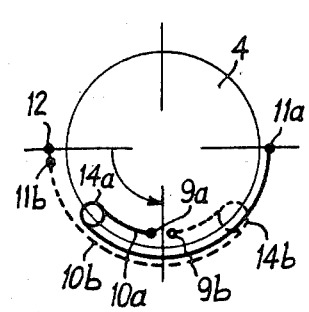

At the beginning of rotation of the rotatable structure 1 with respect to the fixed structure 4 (FIG. 5a), it is hose 10a which has its connector 11a connected to the connector 12 on the ship or rotatable structure 1. During the rotation phases shown at FIGS. 5b to 5e, wheels 14a and 14b turn to respectively wind and unwind the lengths of the hoses 10a and 10b respectively until the positions shown in the FIG. 5e are reached in which wheel 14b supporting hose 10b moves to the region of connector 12 on the rotatable structure 1. At this time, by means not shown, the connector 11b is connected to connector 12 which is provided with two connectors. During the beginning of the following rotation phase, the transfer of fluid which was previously carried out by hose 10a is transferred to hose 10b. Connector 11a of hose 10a is then disconnected. It is to be understood that suitable valves are provided in the hoses 10a and 10b, preferably adjacent the connector ends 11a and 11b, to enable shutting off the flow of the fluid selectively from either of these hoses.

Figure 5I:
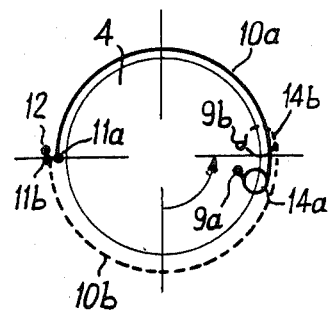

During later phases of rotation, wheels 14a and 14b continue to turn, eventually reaching the position of FIG. 5i in which connector 11a of hose 10a is connected to connector 12, followed by disconnection of connector 11b of hose 10b, thereby maintaining continuity of transfer of fluid as described above. Thus, the structures have returned to the relative positions of FIG. 5a.

As a variation, the hoses 10a and 10b can remain permanently connected to the movable structure 1, and the connecting and disconnecting operations can be carried out at the points of connection of these holes 10a and 10b to the fixed structure 4. Continuity of the transfer of the fluid is again maintained.

Although the invention has been described in connection with a particular application and particular embodiments, it is not thereby limited, and numerous changes and variations can be made without departing from the scope or spirit of this invention.

I claim:

1. Apparatus providing a swivelless connection of first and second fixed positions on respective first and second structures, which structures are relatively rotatable about a common axis, through a length of flexible conduit defined by first and second spaced portions thereof respectively connected to the first and second fixed positions and predetermined in accordance with the extent of relative rotation to be accomodated while continuously maintaining the connection, comprising:

first conduit storing means on the first support structure, extending about the axis of rotation in a generally arcuate configuration, for storing thereon, in corresponding arcuate configuration, substantially all of the predetermined length of flexible conduit;

second conduit storing means on the second support structure, extending about the axis of rotation in a generally arcuate configuration and relatively displaced from said first conduit storing means, for storing, in corresponding arcuate configuration, substantially all of the predetermined length of flexible conduit; and guide means defining a guide path extending between said first and second conduit storing means, said guide means being rotatable about the axis of rotation during relative rotation of the first and second structures for engaging a portion of the predetermined length of flexible conduit intermediate the first and second spaced portions thereof and guiding same out of one and into the other of said conduit storing means.

2. Apparatus as recited in claim 1, wherein said first and second conduit storing means are relatively displaced from each other in a direction parallel to the axis of rotation.

3. Apparatus as recited in claim 2, wherein said first and second conduit storing means extend about the axis of rotation at substantially similar radii.

4. Apparatus as recited in claim 3, wherein; the arcuate segment defined by the predetermined length of flexible conduit, when substantially all thereof is stored in one of said first and second conduit storing means, defines approximately one-half of the angular extent of relative rotation in each of first and second, opposite senses, and accordingly the required, predetermined length of flexible conduit in accordance with the extent of relative rotation to be accommodated.

5. Apparatus as recited in claim 2, wherein said second conduit storing means extends about the axis of rotation at a radius slightly greater than the radius at which the first conduit storing means extends about the axis of rotation.

6. Apparatus as recited in claim 1, wherein; each of said first and second conduit storing means extends about the axis of rotation completely so as to define an annulus.

7. Apparatus as recited in claim 6, wherein; each of said first and second conduit storing means is of sufficient capacity, in cross-section, to store more than one turn of the conduit therein.

8. Apparatus as recited in claim 1, wherein said second conduit storing means extends about the axis of rotation at a radius which exceeds the radius at which said first conduit storing means extends about the axis of rotation by the length of the guide path of said guide means which extends therebetween.

9. Apparatus as recited in claim 1, wherein said guide means comprises a wheel having a peripheral surface configured to receive and thereby engage a portion of the flexible conduit, said wheel being rotatable about an axis extending generally transversely to the axis of rotation, and the axis of rotation of the wheel being qenerally transverse to the axis of relative rotation of the first and second structures.

10. Apparatus as recited in claim 1, wherein said guide means comprises a wheel having a peripheral surface configured to receive and thereby engage a portion of the flexible conduit, said wheel being rotatable about an axis extending generally transversely to the axis of rotation and the axis of rotation of the wheel being qenerally parallel to the axis of relative rotation of the first and second structure.

11. Apparatus providing a swivelless connection through a flexible conduit between first and second fixed positions on respective first and second structures which are relatively rotatable about a common axis, comprising:

first and second means on the first and second structures at the first and second positions, respectively, for engaging a flexible conduit at respective first and second portions defining a predetermined length of flexible conduit therebetween, and thereby connecting the first and second fixed positions through the predetermined length of flexible conduit;

first conduit storing means on the first structure, extending at a substantially uniform radius about the axis of rotation and of a circumferential length sufficient to receive and store thereon substantially all of the predetermined length of flexible conduit;

second conduit storing means on the second structure extending at a substantially uniform radius about the axis of rotation and of a circumferential length sufficient to receive and store thereon substantially all of the predetermined length of flexible conduit; and guide means defining a guide path extending between said first and second conduit storing means, said guide means being rotatable about the axis of rotation during relative rotation of the first and second structures for guiding the predetermined length of flexible conduit out of one and into the other of said first and second conduit storing means.

12. Apparatus providing a swivelless connection between a first, fixed position on a turret and a second, fixed position on a ship, the turret being mounted on the ship for relative rotation about a common axis and the turret being restrainable against rotation, the swivelless connection including a flexible conduit which is connected at spaced portions thereof to the first and second fixed positions on the turret and the ship respectively, defining therebetween a length of flexible conduit which is determined in accordance with the extent of rotation of the ship relative to the turret to be accommodated while continuously maintaining the connection of the first and second fixed positions through the predetermined length of flexible conduit, said turret having a qenerally circular periphery, and comprising:

first conduit storing means on the turret, extending about the axis of rotation in arcuate configuration, throughout at least a segment of and closely adjacent to the circular periphery of the turret for an arcuate distance sufficient to store therein, in corresponding arcuate configuration, substantially all of the predetermined length of flexible conduit;

second conduit storing means on the ship, extending in corresponding arcuate configuration, displaced from said first conduit storing means, for an arcuate distance sufficient for storing, in corresponding arcuate configuration, substantially all of the predetermined length of flexible conduit; and guide means defining a guide path extending between said first and second conduit storing means, for engaging a portion of the predetermined length of flexible conduit intermediate the the first and second spaced portions thereof respectively engaged at the first and second fixed positions respectively on the turret and the ship, and being rotatable about the axis of rotation, during relative rotation of the turret and the ship, for guiding the predetermined length of flexible conduit out of one and into the other of said first and second conduit storing means.

13. Apparatus as recited in claim 12, wherein: said guide means rotates about the axis of rotation in the same sense as the direction of relative rotation of the ship about the turret, for each of the opposite senses of relative rotation therebetween, and guides the predetermined length of flexoble conduit from the conduit storing means of the turret to the conduit storing means of the ship for one sense of relative rotation therebetween, and from the conduit storing means of the ship to the conduit storing means of the turret in the opposite sense of relative rotation therebetween.

14. Apparatus providing a swivelless fluid transfer connection between first and second fixed positions on respective first and second structures, the first of which is adapted to be fixed and the second of which is moveable so that the structures are relatively rotatable about a common axis, through a length of flexible fluid transfer conduit defined by first and second spaced portions thereof respectively connected to the first and second fixed positions and predetermined in accordance with the extent of relative rotation to be accomodated while continuously maintaining the connection, comprising:

first conduit storing means on the first support structure, extending about the axis of rotation in a generally arcuate configuration, for storing thereon, in corresponding arcuate configuration, substantially all of the predetermined length of flexible fluid transfer conduit;

second conduit storing means on the second support structure, extending about the axis of rotation in a generally arcuate configuration and relatively displaced from said first conduit storing means, for storing, in corresponding arcuate configuration, substantially all of the predetermined length of flexible fluid transfer conduit; and guide means defining a guide path extending between said first and second conduit storing means, means mounting said guide means for movement in a circular path about the axis of rotation during relative rotation of the first and second structures for engaging a portion of the predetermined length of flexible fluid transfer conduit intermediate the first and second spaced portions thereof and guiding same out of one and into the other of said conduit storing means.

15. Apparatus according to claim 14 wherein, said curved surface comprises a roller track.

16. Apparatus according to claim 14, wherein said curved surface comprises a peripheral surface of a rotatable wheel.

17. Apparatus according to claim 14, further comprising, means for driving said curved surface around the axis in a direction to maintain tension in said conduit during relative rotation of said structures.

18. Apparatus according to claim 14, wherein said means mounting said curved surface for movement in a circular path, comprises a frame rotatable around the fixed structure.

19. Apparatus according to claim 18, wherein said frame has an upper portion and a lower portion, and there is further provided track means on the rotatable structure for guiding said lower portion during rotation of the frame, and track means on the fixed structure for guiding said upper portion during rotation of the frame.

20. Apparatus according to claim 14, wherein said means for storing the flexible conduit on the rotatable structure comprises at least one annular well for receiving successive convolutions of the conduit vertically upon each other.

21. Apparatus according to claim 20, wherein said, means for storing the flexible conduit on the fixed structure comprises at least one radially outwardly opening groove in a side wall of the fixed structure in the region of an upper portion of the fixed structure, for receiving successive convolutions of the hose horizontally.

22. Apparatus according to claim 10, wherein said, means for storing the flexible conduit on the fixed structure comprises at least one upwardly opening groove near the periphery of the fixed structure, for receiving successive convolutions of the conduit vertically upon each other.

23. Apparatus according to claim 14, wherein said conduit comprises at least one conduit of a set of conduits grouped in a bundle, and said curved conduit engaging support engages several conduits of said bundle to guide the bundle of conduits along paths on the fixed and rotatable structures.

24. Apparatus according to claim 14, further comprising two conduits and two curved conduit guides, one for each conduit, each conduit having a length slightly greater than one-half the circumference of the fixed structure, first means for connecting common ends of said conduits to first connector means on one of said structures, second means for connecting the other, common ends of said conduits to second connector means on the other of said structures, at least one of said first and second connector means comprising quick release and connecting means so that the corresponding, common ends of the conduits can each be selectively connected to and disconnected from the corresponding one of said structures to permit continued relative rotation of said rotatable structure in the same direction relative to said fixed structure, while providing continuity of fluid transfer.

* * * * *